(12) United States Patent
Wilson et al.

(10) Patent No.: US 7,665,282 B2
(45) Date of Patent: Feb. 23, 2010

(54) LAMINATE AND METHOD FOR MAKING HORN WRAPS

(75) Inventors: Robby Wayne Wilson, Stephenville, TX (US); Terri Mozelle Kindle, Granbury, TX (US)

(73) Assignee: Equibrand Products Group LP, Granbury, TX (US)

( * ) Notice: Subject to any disclaimer, the term of this patent is extended or adjusted under 35 U.S.C. 154(b) by 65 days.

(21) Appl. No.: 12/152,078

(22) Filed: May 12, 2008

(65) Prior Publication Data

US 2008/0274337 A1    Nov. 6, 2008

Related U.S. Application Data

(62) Division of application No. 11/010,547, filed on Dec. 13, 2004, now Pat. No. 7,386,972.

(51) Int. Cl.
*B68G 1/00* (2006.01)
(52) U.S. Cl. ...................................... 54/44.7
(58) Field of Classification Search ......... 54/79.1–79.4, 54/44.7
See application file for complete search history.

(56) References Cited

U.S. PATENT DOCUMENTS

| | | | | | |
|---|---|---|---|---|---|
| 2,133,603 | A | * | 10/1938 | Wells | 340/815.4 |
| 3,766,889 | A | * | 10/1973 | Mills et al. | 119/851 |
| 3,834,354 | A | * | 9/1974 | Kelton | 119/851 |
| 5,179,821 | A | * | 1/1993 | Hiser | 54/44.1 |
| 5,535,707 | A | * | 7/1996 | Siddoway | 119/851 |
| 5,546,735 | A | * | 8/1996 | Brooks | 54/82 |
| 5,826,412 | A | * | 10/1998 | Harrell et al. | 54/1 |
| 6,062,006 | A | * | 5/2000 | Jones | 54/44.7 |
| 6,786,028 | B1 | * | 9/2004 | Longtin | 54/79.2 |

* cited by examiner

*Primary Examiner*—Thomas Price
(74) *Attorney, Agent, or Firm*—John H. Miller

(57) ABSTRACT

A laminate comprising a compressible, cushioning layer and an open layer comprised of a tough, reinforcing woven or non-woven mesh, net, webbing, scrim or sheet material having openings therein and attached to the compressible, air permeable, cushioning layer is particularly useful for producing horn wraps that permit ventilation for the parts of the horns and head in contact with a horn wrap product. Permeable or air ventilating laminates of various materials and configurations are disclosed along with methods of making horn wraps using the laminates.

9 Claims, 6 Drawing Sheets

LAMINATE AND METHOD FOR MAKING HORN WRAPS

This application is a division of U.S. patent application Ser. No. 11/010,547, filed Dec. 13, 2004, now U.S. Pat. No. 7,386,972, issued Jun. 17, 2008.

The present invention involves laminate material, horn wraps made from the laminate and a method of making horn wraps.

Rodeo livestock are screened to determine if they perform in a manner to challenge the rodeo contestants. When such animals are found, they are transported from rodeo to rodeo. One of the competitions is team roping in which one roper, the header, ropes the horns of a steer and the other member of the team, the healer, ropes the rear legs. Competitive lariats used in competition and ranching by the header are relatively stiff. As the loop of the lariat tightens around the horns, the rope or loop rubs against the base of the horns often causing damage to one or more of the horns, ears and head. This damage worsens with additional ropings as the animal is used again and again. Soon the cumulative damage can cause the animal to lose a horn making it necessary to retire this animal from the rodeo stock. Also, if the animal's ears and area around the ears are not protected during roping, the ears and that area can be injured by the rope and the tightened loop. To protect the animal's horns and ears and area beneath the ears, it is conventional to strap protective horn wraps, including flaps to cover the ears, on the animal before each team roping competition. The animal wears these protective horn wraps for a substantial time waiting for its time to perform and also afterwards.

Horn wraps are known, such as pictured on page 32 of the NRS 2004 Spring Catalog. Prior art horn wraps include one having two individual horn wraps attached with a strap, the wrap for each horn comprising a laminate of a thick, needled, polymer fiber felt stitched to a woven polymer fiber webbing or canvas. The needled felt provides a cushion against the sting of the lariat impact and the rubbing of the rope, and the woven webbing or canvas provides the strength and toughness needed for durability during use, something lacking in the needled felt. This laminate material encircles the lower portion of a horn and extends into a flap that holds down and protects an ear. A strap made from a strong, woven webbing is usually attached to the flap. The strap on an individual horn wrap on one side is usually longer than the strap on the other individual horn wrap and has spaced apart holes down the center of a loose end portion of the strap. The strap on the flap of the opposite horn wrap contains a buckle, like a large belt buckle.

After these prior art horn wraps are placed over each horn, the longest strap is looped around the bottom of the animals neck and fastened with the buckle on the other strap to secure the horn wraps onto the animal in a known manner. The size of the ear flap of the horn wrap does vary between conventional products, some being large enough to protect part of the side of the animal's head or cheek as well as the ear from the loop of the lariat.

The laminates used in the conventional horn wraps have a relatively high resistance to air flow through the laminate, i.e. a low air permeability, and also have a relatively high resistance to laminar air flow through the laminate and the felt against the animal. This causes the animal to build up moisture, perspiration, between the laminate and the horns, ears and other parts of the head covered by the laminate. This accumulated perspiration also damages the skin around the horns and the ears. This damage develops into problems that often distresses and disqualifies the animal from further roping use.

The invention includes a laminate of a permeable material such as a felt, a needled felt, a permeable foam, an open structure comprising fibers bonded together at some or all of their cross-over points, and like materials fastened to a reinforcing material that includes a very open mesh or net material, the permeable material and the laminate having a high air permeability such that the laminate has an air permeability of at least about 40 cubic feet per minute as measured by a Frazier Differential Pressure Air Permeability Tester at a pressure drop of 0.5 inch. Preferably, the laminate comprises a polymer fiber felt and most preferably the felt is a needled felt. Typically, the mesh or net is made of polymer fibers and most typically the mesh material comprises nylon fiber coated with polyvinyl chloride. The felt can be fastened to the mesh or net material by any suitable manner that produces the desired air permeability. Most typically the fasteners, such as rivets, bolts, stitching or the like, pass through both the felt and the mesh or net material.

Typically, the permeability of the felt and the finished laminate is at least about 50, more typically at least about 75 and most typically at least about 100 CFM/sq. ft. The desired air permeability can be achieved in the felt by controlling the density of the felt, by controlling the fiber diameter, and length distribution, by perforating the felt to form holes at least partially through the thickness of the felt, and by other known methods. Typically, the desired air permeability is achieved by punching or forming holes at least partially through the thickness of the felt. The desired air permeability can be achieved with holes by controlling the diameter of the holes, the depth of the holes and the spacing of the holes from each other. Most typically the holes pass entirely through the felt, but that is not necessary to achieve the desired permeability as the holes can only partially penetrate the felt thickness.

The invention includes a horn wrap comprising at least one loop for encircling an animal's horn and at least one flap for covering at least the animal's ear comprising a protective laminate that provides a protective cushion and air ventilation to the horn or ear or both covered by the protective laminate. The air ventilation is provided by one or more of a group consisting of air permeability through the laminate of at least about 40-50 CFM/SF, at a pressure drop across the laminate of about 0.5 inch, lateral air passages in a portion of the laminate running through an animal contacting surface, and generally lateral air passages in the laminate that communicate with the surface of the animal in the area(s) of animal contact, or any combination thereof.

The invention includes a protective horn wrap for an animal comprising any laminate described above, typically a laminate having a relatively low resistance to air flow such that the laminate has an air permeability of at least about 40-50 cubic feet per minute as measured by a Frazier precision instrument. Typically, the laminate comprises a polymer fiber felt and most usually, but not necessarily, the felt is a needled felt. Typically, the mesh fabric or net material is made of polymer fibers and most preferably the mesh material comprises nylon fiber coated with polyvinyl chloride. The felt can be fastened to the mesh fabric or net material by any suitable manner that produces the desired air permeability. Typically, the fasteners, such as rivets, bolts, stitching or the like, pass through both the felt and the mesh or net material. Typically, the Frazier air permeability of the finished laminate is at least about 75, more typically at least about 150 and most typically at least about 200 or even at least about 250 CFM/sq.

ft The horn wraps of the invention can be used as individual left and right side wraps, attached separately, but more often the horn wrap of the invention comprises two individual horn wraps, each also comprising an ear protective flap, attached together in a spaced apart relationship with at least one strap.

The invention also includes a method of making a horn wrap comprised of at least one loop for protecting a horn of an animal and at least one ear flap for protecting an ear of said animal, the loop comprised of a laminate of cushioning material attached to a layer of tough, reinforcing material, the improvement comprising making the laminate from a layer of cushioning material and a tough, reinforcing material and causing the laminate to have good air ventilation by one or more reasons selected from a group consisting of an providing an air permeability within the laminate, at a pressure drop across the laminate of about 0.5 inch, of at least about 40-50 CFM/SF, forming lateral air passages in a top portion of the laminate including an animal contacting surface, and forming generally lateral air passages that communicate with said contacting surface, and any combination of these air ventilation techniques. The laminate used need not be permeable, but most typically the laminate will have a permeability of at least about 40-50 CFM/SF.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

Figure 1:
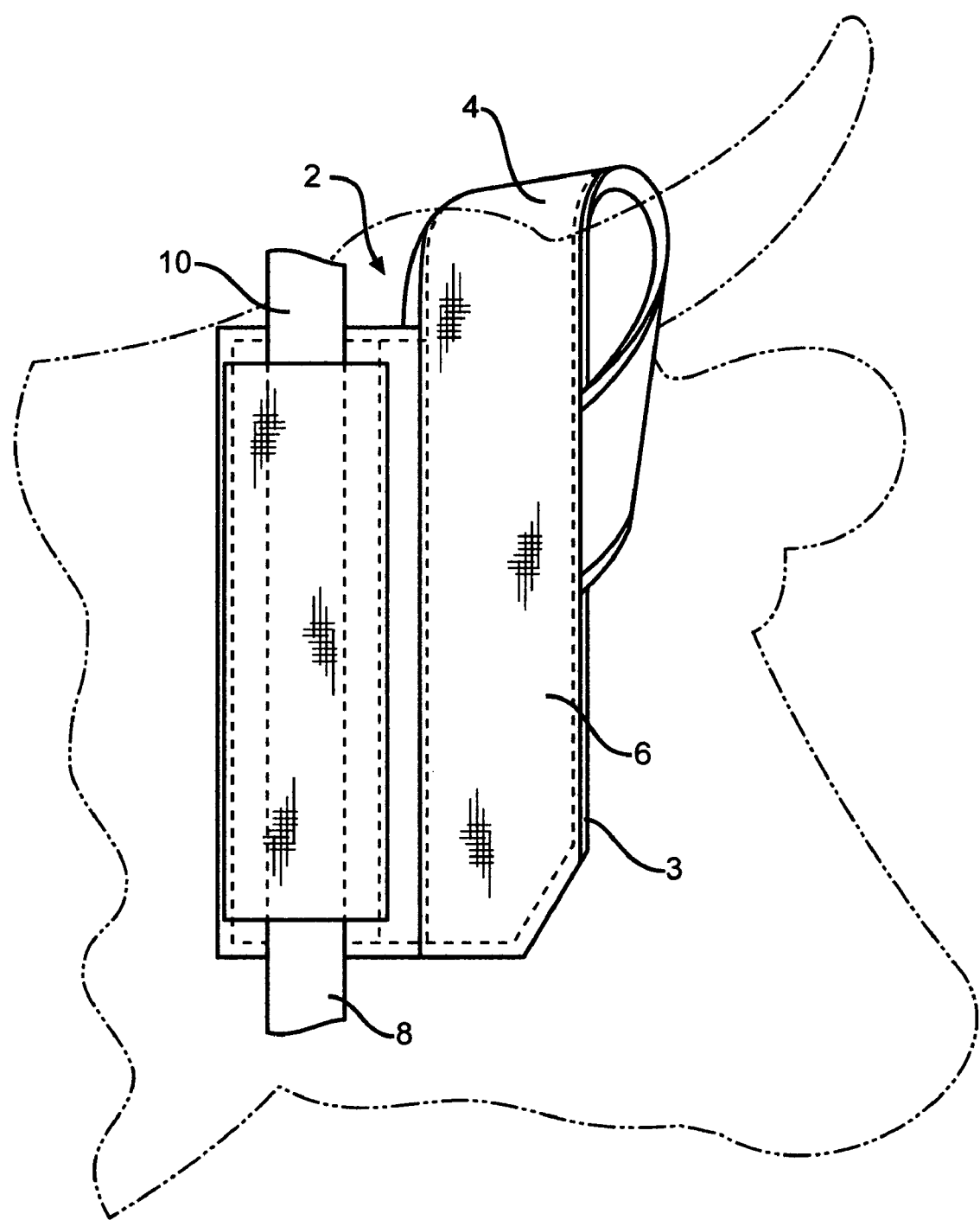
FIG. 1 is a plan view of the exposed side of the horn wrap shown in FIG. 1A.
Figure 1A:
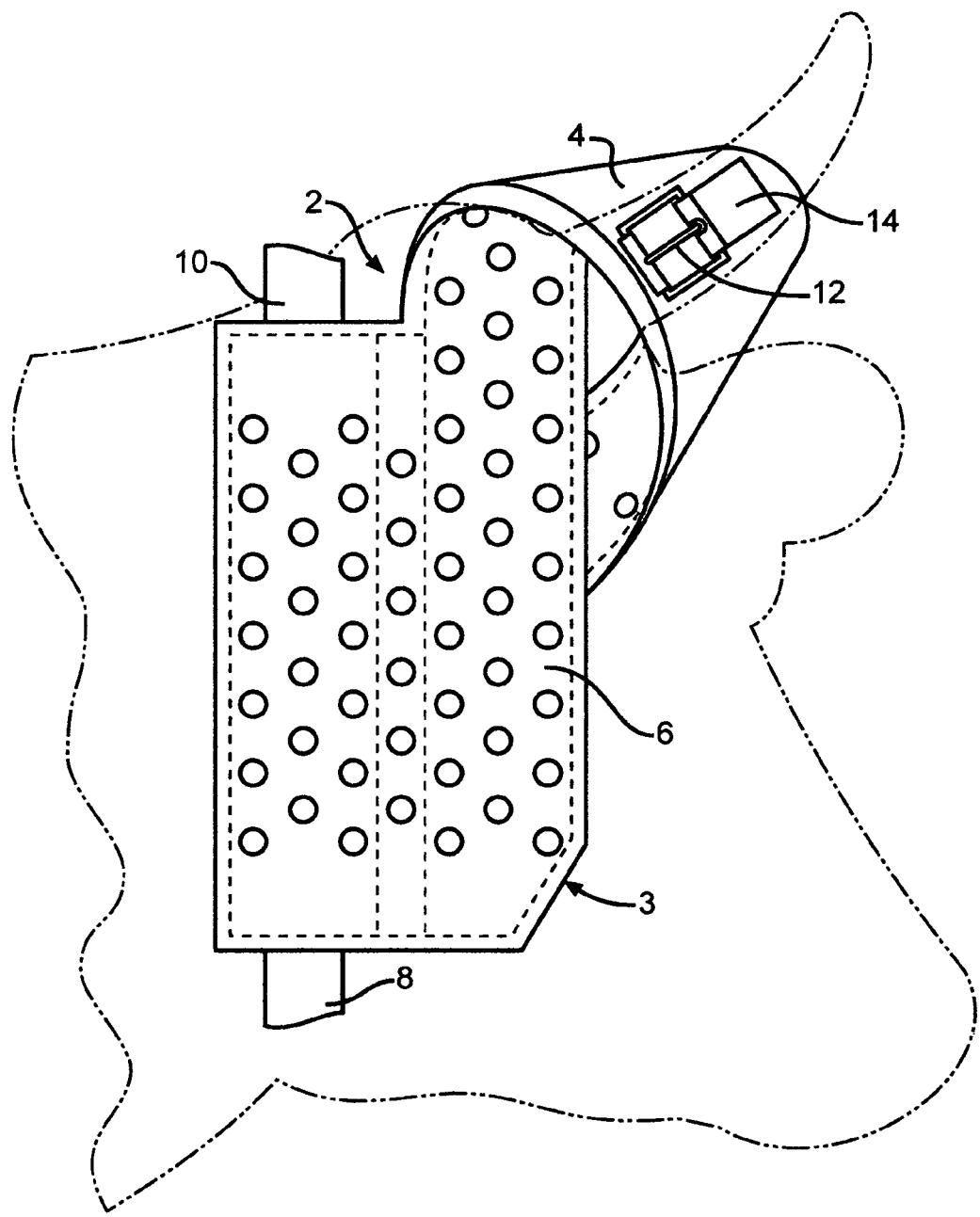
FIG. 1A is a plan view of the animal contacting side of a preferred horn wrap according to the invention.

An embodiment of a horn wrap 2 of the present invention is shown in FIGS. 1, 1A, 2 and 4, and is comprised of two individual horn wraps 3, each with a horn surround or horn contacting portion 4, an ear/cheek contacting portion or flap 6, and an optional connecting strap 8 that is fastened to a lower portion of each of the two ear/cheek flaps 6. A fastening belt strap 10 is connected to an upper portion of one of the ear/cheek flaps 6, and a fastening means such as a buckle 12 held to the horn contacting portion 4 with a fastener mounting device, such as strap 14, that is secured to the horn contacting portion 4 on the other ear/cheek flap 6 and to the buckle 12. While the horn wrap 2 is shown with the two ear/cheek flaps 6 joined together with the optional strap 8, the present invention also includes an embodiment where the strap 8 is not used and the horn wrap is comprised of two separate, individual parts that fasten together with the belt strap 10 and buckle 12 in a conventional manner after the two separate, individual parts are placed on the animal.

In the most typical horn wrap embodiment 2, the horn contacting portion 4 and the ear/cheek-contacting portion 6 are integral, but that also is not essential to the present invention. These portions 4 and 6 can be separate portions that are spaced apart and joined together with one or more straps, rope sections, or other conventional connecting means.

Figure 2:
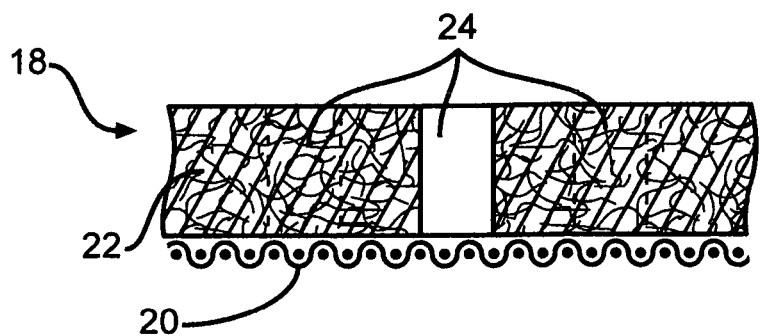
FIG. 2 is a cross section view of a portion of a typical laminate according to the present invention.
Figure 4:
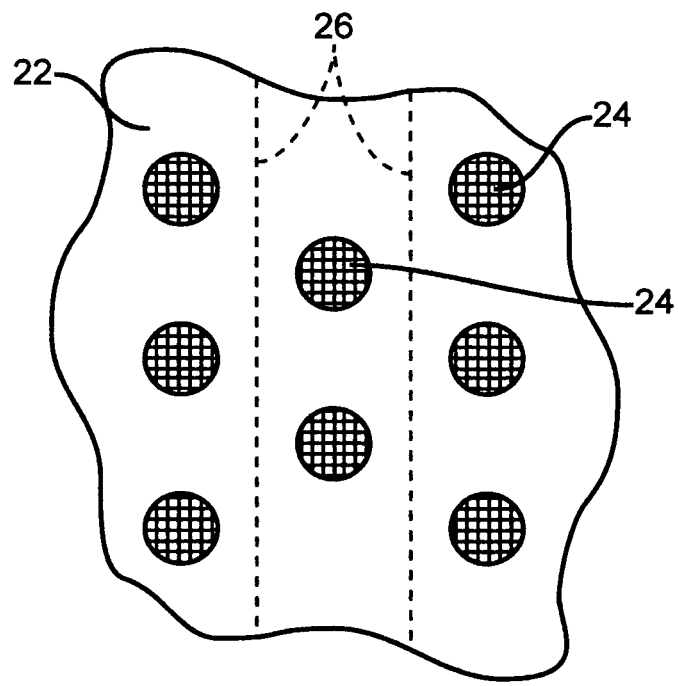
FIG. 4 is a partial plan view of an ear/cheek flap and horn surround shown in FIGS. 1 and 1A with the type of laminate shown in FIG. 2.

The ear/cheek flaps 6 and the horn contacting portions 4 are made from a novel laminate 18 comprising a layer or sheet 20 of open woven or nonwoven material that has an air permeability of greater than about 40 or 50 CFM/SF, typically greater than about 75 CFM/SF and more typically greater than about 100 CFM/SF, e.g. greater than about 200 CFM/SF, see FIGS. 2 and 4, and a layer of compressible material 22. Many materials such as a scrim, netting, open webbing, a layer of sheet material such as leather, vinyl, etc. containing perforations or openings through the layer and equivalent materials can be used for the layer 20. The perforations or openings in the sheet material can align with holes in the compressible layer when present if desired, but that is not necessary. A particularly exemplary material for layer 20 is an open, woven fabric comprised of PVC (polyvinyl chloride coated nylon referred to as 1000D, and further described as Mesh: 1000D Nylon/PVC, weight (420 g/m2), strand density (12 strands per inch×16 strands per inch). Such a material can be obtained from Xiamen Leadlex Industrial Corp. of Zhong Zhai, Heshan Huli District, Xiamen Fujian, China. The open, reinforcing layer 20 provides most of the lateral strength needed for good durability of the product. Many materials can be used for the reinforcing layer 20 and preferably the material is tough, water resistant, mildew resistant and abrasion resistant.

This particular exemplary laminate of the invention, and for use in this exemplary horn wrap of the invention, is shown in cross section in FIG. 2 and in plan view in FIG. 4, and is comprised of a compressible layer 22 as cushioning layer having a thickness of at least about 3 millimeters and typically at least about 6 millimeters, more typically at least about 10 millimeters. Particular exemplary materials for this layer include needled or felted fibers. Other compressible materials can also be used including an open-celled foam, a perforated closed-cell foam, dry-formed or wet-formed felt, needled or un-needled, and equivalent materials meeting the permeability requirements and/or the protective compressibility needs.

A high permeability is not required if means are present for good cross ventilation as will be described later. Only enough compressibility or cushion is necessary to absorb much of the shock of the lariat so as to protect the animal from injury. The degree of compressibility is known in the art from prior practice with commercial products or conventional horn wraps used in competitions.

In the particular exemplary embodiment 18, shown in FIGS. 1 and 2, the layer of compressible material 22 is a needled felt about 13-14 millimeters thick having holes 24 completely through the needled felt layer 22, the holes having a diameter of about 8 millimeters diameter and being in staggered rows with hole centerlines about 14 millimeters apart, the centers of the holes in each row being about 30 millimeters apart. This most preferred needled felt is comprised of polypropylene fibers needled together to form the felt having a density of about 1800 grams per square meter before the holes are punched out of the compressible layer 22. The compressible layer 22 is attached to the open woven layer 20 by any suitable manner, including with appropriate rows of stitching 26 (FIG. 4.), e.g. using nylon or other type of thread in a conventional manner.

Figure 3:
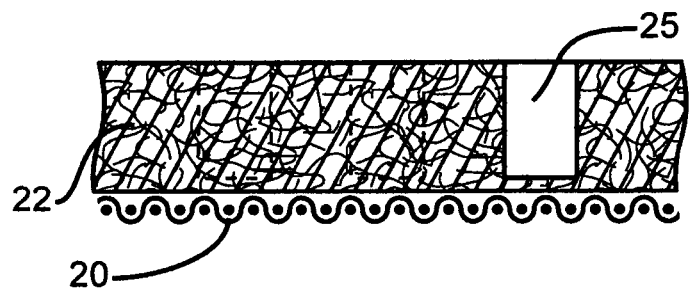
FIG. 3 is a cross section view of a portion of another laminate according to the present invention.
Figure 5:
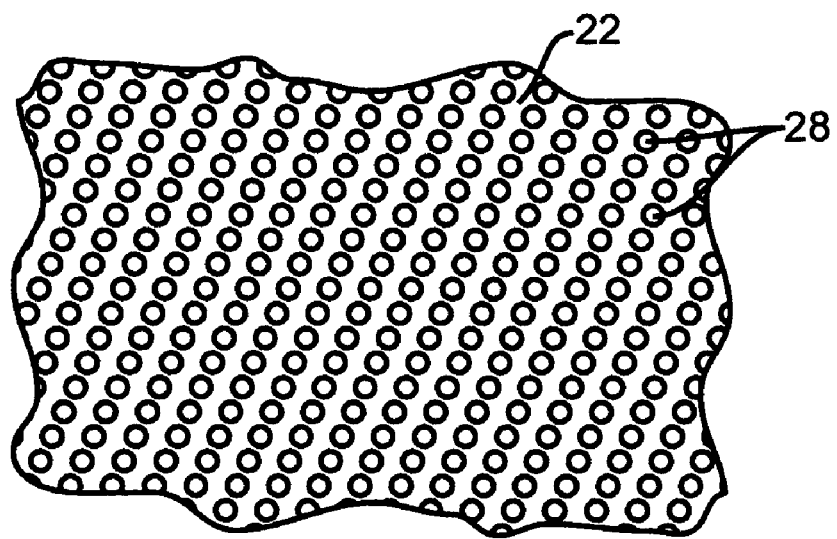
FIG. 5 is a partial plan view of a different laminate embodiment according to the present invention.
Figure 6:
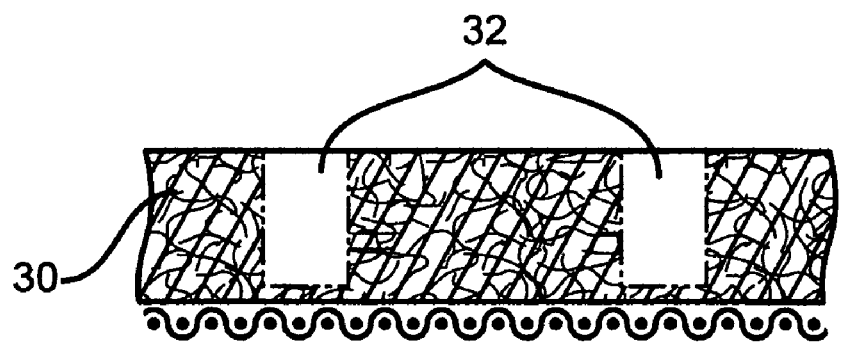
FIG. 6 is a partial cross sectional view of a still different laminate embodiment according to the present invention.

Other thicknesses and types of compressible materials can be used in this invention so long as the specified air permeability is met. The compressible material needs to be tough, and preferably does not deteriorate when becoming wet with rain, animal perspiration or other aqueous liquid, but high strength is not a crucial property since the necessary strength is provided by the layer of open material 20. The layer of compressible material 22 can have different sized holes, different patterns of holes, different depth holes or depressions, i.e. the holes need not penetrate the entire thickness of the compressible layer as shown in FIG. 3 by holes, or depressions, 25. The holes 25 need not be the shape shown, but can have tapered or rough surfaces. The compressible layer 22 need have no holes or depressions at all, so long as the specified air permeability requirement is present. The holes can be much smaller and closer together with an orderly or random pattern, such as shown in FIG. 5 as holes 28, again so long as the air permeability requirement is met. As shown in FIG. 6, the compressible layer can be a permeable or non-permeable foam material 30 having holes 32 therein. The holes 32 are optional with a permeable foam, having open cells or continuous channels between cells providing connected paths in the foam structure to allow air to pass through the foam layer 30.

The compressible material layer need not have holes so long as the layer has an air permeability of at least about 50 CFM/SF, more typically higher as described above. This material can be a very porous material such as found extensively in packing materials. One packing material of this type comprises fibers, preferably curly fibers, bound together with an elastomeric binder such as a styrene-butadiene polymer at fiber crossings to form a very open, permeable and compressible material that is water resistant. Often hog hair is used as the fiber, but other kinds of fibers including glass fibers and polymer fibers or other animal hair can be used. This type of material is also suitable for the invention as the compressible layer in the laminate.

One laminate of the invention has a low resistance to air flow therethrough, the laminate having an air permeability of at least about 40-50, typically at least about 75, and more typically at least about 100 cu. ft. per min./sq. ft. (CFM/SF), or higher, as measured with a Frazier™ Differential Pressure Tester available from The Frazier Precision Instrument Company of Hagerstown, Md. A one-half inch pressure drop was used in an air perm test used to measure the air permeability of the various products disclosed herein. A two millimeter orifice was used on the samples having an air perm of less than 100 CFM/SF and but an eight millimeter orifice was necessary on embodiments having an air perm of more than 200 CFM/SF to maintain the one-half inch pressure drop across the sample.

When this test was performed on the laminate 6 shown in FIGS. 1, 1A, 2 and 4, the laminate had a permeability ranging from 268 to 315 CFM/SF with an average of 291 CFM/SF. The same tests were conducted on two commercially available horn wraps also containing a laminate structure. The air permeabilities of the laminate structures in these two prior art products were 10-20 CFM/SF in one laminate and about 25 CFM/SF in the other laminate used in the two conventional and commercial horn wrap products.

The horn wraps of the present invention can also be made using a permeable or impermeable, compressible material having lateral or generally lateral paths for cross ventilation of air. By generally lateral is meant that the paths are not necessarily in the same plane, or of the same depth, but are continuous across the animal contacting surfaces of the compressible layer. Examples of these types of laminates are shown in FIGS. 7-11. The laminate of this invention is comprised of a compressible material having air passages in the top surface, the surface that contacts the animal when used in a horn wrap. Typically, the air passages are generally straight lines and generally in the same plane, but they can dip, rise or undulate either in one or both the horizontal and vertical directions so long as they extend, at least frequently, to the top surface.

Figure 7:
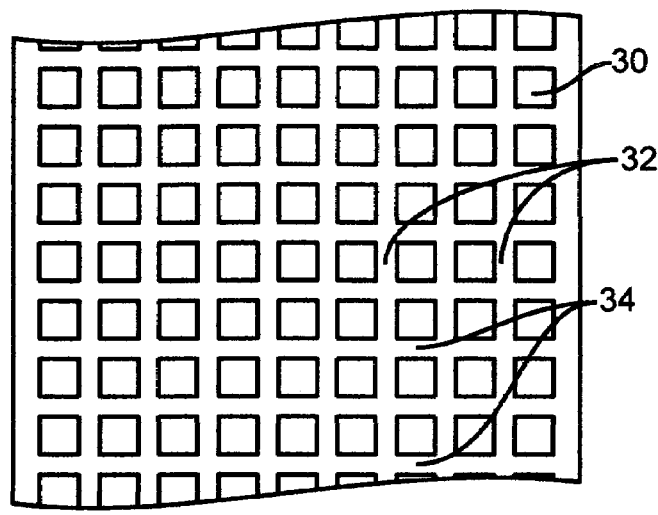
FIG. 7 is a partial plan view of another laminate embodiment of the invention.

In the embodiment shown in FIG. 7, a plan view of a top or animal contacting surface 30 of a compressible layer, air or ventilation passages 32 and 34 are straight and in an XY pattern running at right angles to each other, but the passages can be at any angle. The compressible layer is comprised of a plurality of projections or islands 33 in a checkerboard pattern, but the islands 33 can be of any shape and the top surface 30 need not be continuous, i.e. it can comprise the tops of bumps, crowns, etc. Typically the ventilation passages 32,34 are spaced no more than an inch apart, but can be farther apart, especially in dry and/or cold environs. The layer 38 can be same or similar to open layer or sheet 20, but need not be since permeability is normally not required of the layer 38 because of the generally lateral ventilation passages 32,34.

Figure 8:
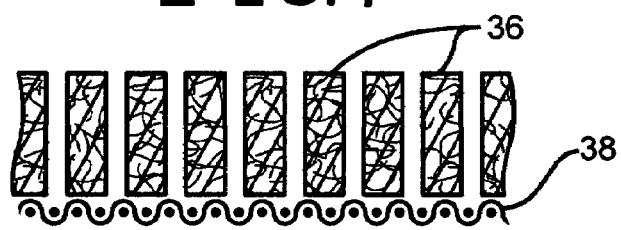
FIGS. 8-10 are partial cross sectional views of still further laminate embodiments of the invention.
Figure 9:
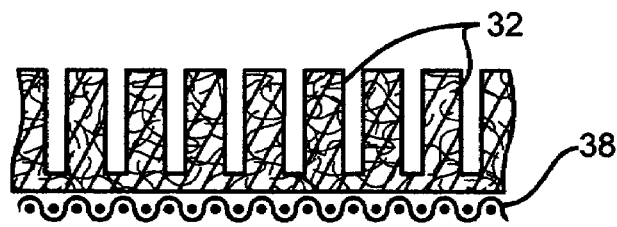
Figure 10:
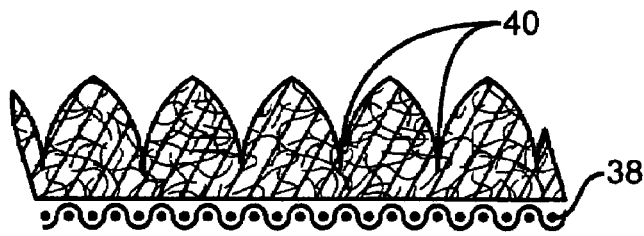
Figure 11:
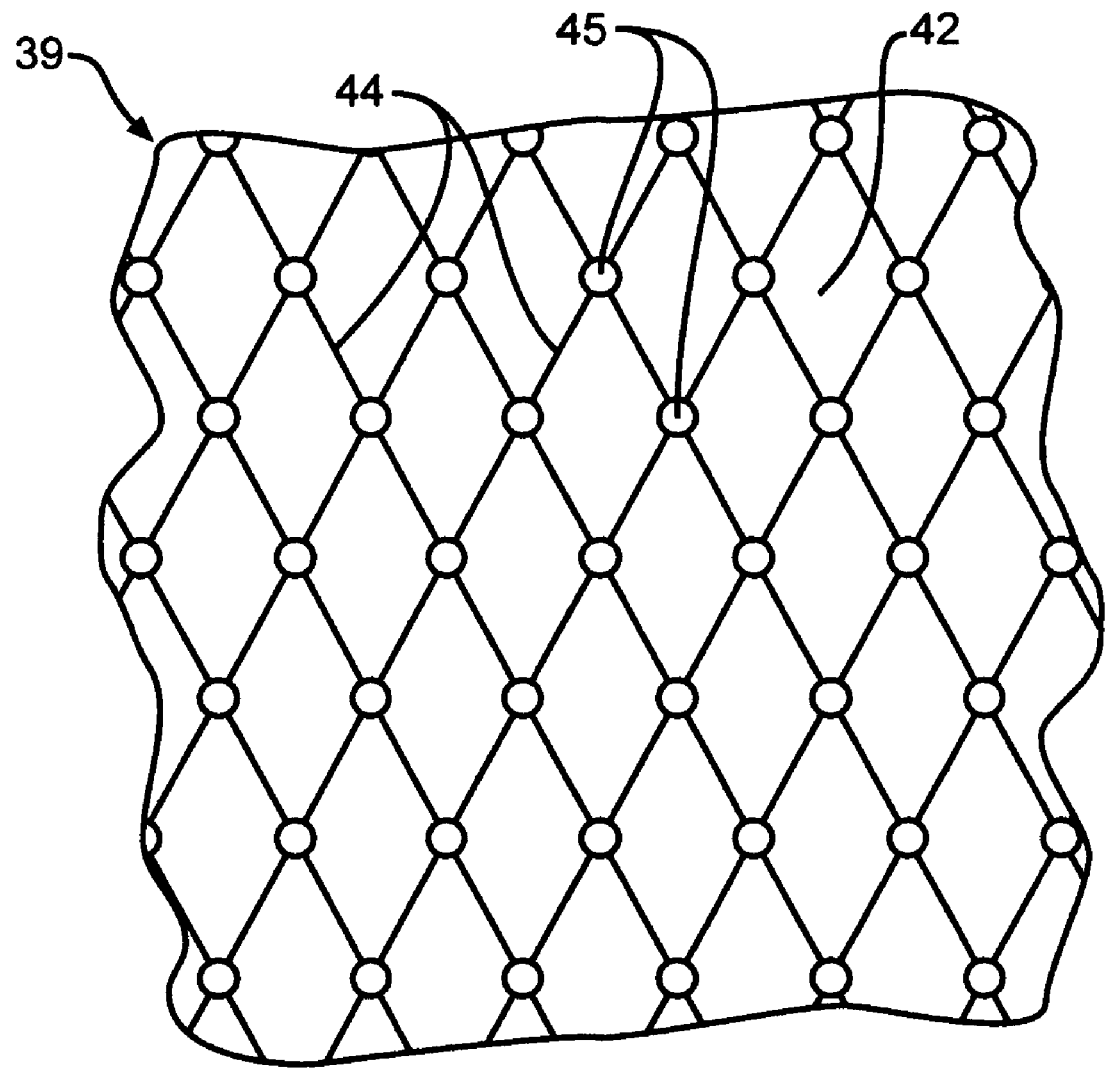
FIG. 11 is a partial plan view of the embodiment shown in FIG. 10, and showing a further optional feature.

As shown in the embodiment of FIG. 8, the compressible layer 33 can also have holes 36 therein to also permit vertical air-flow. The air passages or slots 32, 34, in the compressible layer 33 can extend all the way to the tough reinforcing layer 38, as shown in FIG. 8, or only part way through as shown in FIGS. 9 and 10. Also, FIG. 10 shows different shaped ventilation paths or passages produced by using a plastic foam material 39 having various kinds dome shaped peaks 42 and valleys 40, normally used in packaging to cushion the contents of the package. Also, the configuration shown in FIG. 10 can be a layer 33 of foam or other compressible material that is stitched to the reinforcing layer 38 with the stitching 44 compressing the compressible layer 33 to form a plurality of various shapes of domes or islands 42 with ventilation passages 44 separating the islands 42. Optionally, fasteners like upholstery pins or buttons, or rivets, bolts, or other fasteners 45 can be used to replace the stitches 44 or to reinforce the stitches 44.

While many embodiments have been described above, others will be obvious to one of ordinary skill in these arts, having been given the benefit of the above disclosure. Such embodiments are intended to be included in the claims below.

The invention claimed is:

1. A laminate comprising a compressible, cushioning layer and an open layer comprised of a tough, reinforcing woven or non-woven mesh, net, webbing, scrim or sheet material having openings therein attached to the compressible, air permeable layer, the laminate having a Frazier air permeability of at least about 50 cubic feet per minute at a pressure drop of 0.5 inch.

2. The laminate of claim 1 wherein the two layers are attached with stitching.

3. The laminate of claim 1 wherein the air permeability is at least about 200.

4. A laminate comprising a compressible, cushioning layer and an open layer comprised of a tough, reinforcing woven or non-woven mesh, net, webbing, scrim or sheet material having openings therein attached to the compressible, air permeable layer, the laminate having lateral or generally lateral air passages in a top surface of the compressible layer.

5. The laminate of claim 4 wherein the two layers are attached with stitching.

6. The laminate of claim 5 wherein the stitching partially compresses portions of the compressible layer to form said air passages.

7. A method of making a horn wrap comprised of at least one loop for protecting a horn of an animal and at least one ear flap for protecting an ear of said animal, the loop comprised of a laminate of cushioning material attached to a layer of tough, reinforcing material, the improvement comprising making the laminate from a layer of cushioning material and a tough, reinforcing material and causing the laminate to have good air ventilation by one or more reasons selected from a group consisting of an air permeability within the laminate, at a pressure drop across the laminate of about 0.5 inch, of at least about 40-50 CFM/SF, lateral air passages in a top portion of the laminate including an animal contacting surface, and generally lateral air passages that communicate with said contacting surface, and any combination thereof.

8. The method of claim 7 wherein the laminate has an air permeability of at least about 100 CFM/SF.

9. The method of claim 7 wherein the laminate has an air permeability of at least about 200 CFM/SF.

* * * * *